United States Patent [19]

Olasz et al.

[11] Patent Number: 4,724,713
[45] Date of Patent: Feb. 16, 1988

[54] DRIVE SYSTEM FOR AIR BEARING MACHINES

[75] Inventors: Joseph S. Olasz, Kingston; Robert P. Callaghan, Jr., Westerly, both of R.I.

[73] Assignee: Federal Products Corp., Providence, R.I.

[21] Appl. No.: 794,139

[22] Filed: Nov. 1, 1985

[51] Int. Cl.$^4$ .............................................. F16H 25/08
[52] U.S. Cl. ............................................ 74/89; 74/209
[58] Field of Search ........................... 74/209, 206, 89; 384/46, 58

[56] References Cited

U.S. PATENT DOCUMENTS

| | | | |
|---|---|---|---|
| 3,264,814 | 8/1966 | Kuster et al. | 74/206 |
| 4,226,128 | 10/1980 | Dellantonio | 74/89 X |
| 4,378,709 | 4/1983 | Chitayat | 74/89 X |
| 4,411,166 | 10/1983 | Marcovici | 74/89 |
| 4,487,132 | 12/1984 | Fuchs et al. | 74/89 X |

FOREIGN PATENT DOCUMENTS 2142410 1/1985 United Kingdom ............... 74/89

Primary Examiner—Randolph A. Reese
Assistant Examiner—Peter M. Cuomo
Attorney, Agent, or Firm—Morse, Altman, Dacey & Benson

[57] ABSTRACT

An improved drive system for machines incorporating air bearings is disclosed. The drive system eliminates backlash, introduces no vibrations or noise into the moving structures, requires no lubrication and excells in being compact and simple. The drive system essentially includes a stationary bar mounted in one axis of motion of the machine, a wedge member mounted for drivingly engaging the bar on one side, a preloader mounted for operatively engaging the bar on the opposite side, and a pair of springs urging the preloader to urge the wedge member into driving engagement with the bar. The drive system is coupled to a positioning servo system, which provides control of the drive system's position and speed. Preferably, the wedge angle of the wedge member is from about 15° to about 30°. Preferably, both the bar and the wedge member are formed from a group of materials possessing at least about 65 Rockwell hardness.

11 Claims, 7 Drawing Figures

DRIVE SYSTEM FOR AIR BEARING MACHINES

BACKGROUND OF THE INVENTION

1. Field of the Invention

The present invention relates generally to drive systems and, more particularly, to a drive system particularly useful in machines incorporating air bearings and characterized by zero backlash, by introducing no vibrations or noise into the moving structures, and one that requires no lubrication.

2. The Prior Art

Precision machines require precision drives. Precision machines include precision cutting and forming tools, positioning and coordinate measuring machines and surface analysis systems. In precision machines, it is required that one movable part traverses an extremely accurately defined path relative to another part. The movable part's traverse is facilitated by air bearings. Air bearings provide a virtually friction-free guide, see U.S. Patent Nos. 3,578,827 and 4,378,134. Drive systems for such precision machines employing air bearings must be inherently "quiet," however. By the term "quiet," it is meant to define a drive system which introduces no vibrations into the parts and structures it is designed to move. This requirement for quiet drive systems derives from the fact that air bearings inherently possess little or no damping. Due to the lack of sufficient damping, air bearings are most sensitive to vibrations at certain frequencies. Such vibrations and noise adversely affect the performance of these precision machines. Gear drives do introduce such vibrations and noise. Precision machines also require the ability to position the movable parts along the accurately defined path relative to another part. This is accomplished using positioning servos, which require minimal backlash in the drive. Gear drives suffer from backlash, which make them unsuitable for precision machines. The requirement for quiet, non-backlash drive systems in air bearing machines is and remains a compelling consideration for designers of such machines.

SUMMARY OF THE INVENTION

It is a principal object of the present invention to overcome the above disadvantages by providing an improved drive system for use in precision machines incorporating air bearings, which system has zero backlash, introduces no vibrations or noise into the machines and, one which requires no lubrication and which also is small and compact. More specifically, it is an object of the present invention to provide a drive system for precision machines employing air bearings comprising a bar stationarily mounted in one axis of motion of the precision machine, a wedge member mounted on the machine for drivingly engaging the bar on one side, a preloader member mounted for operatively engaging the bar on the opposite side, and a pair of springs urging the preloader member to urge the wedge member into frictional driving arrangement with the bar. The drive system is coupled to a positioning servo system which provides control of the drive system's position and speed in its travel along the axial length of the bar. Preferably, the angle of the wedge member is between about 15° to about 30°. Preferably, the wedge member engages the bar with very high friction in its travel along the axial length of the bar. At the same time that the wedge member is frictionally engaging the bar at the two points of contact with the bar, the drive system exhibits low preloader force on the other side of the bar. Preferably, both the bar and the wedge member are formed from one of a group of materials possessing at least about 65 Rockwell hardness and exhibiting no yield at their contacting surfaces. This group of materials also is characterized by low ductility, with loose particles on their surfaces spalling off rather than building up there.

Other objects of the present invention will in part be obvious and will in part appear hereinafter.

The invention accordingly comprises the improved drive system of the present disclosure, its components, parts and their interrelationships, the scope of which will be indicated in the appended claims.

BRIEF DESCRIPTION OF THE DRAWINGS

For a fuller understanding of the nature and objects of the present invention, reference is to be made to the following detailed description, which is to be taken in connection with the accompanying drawings, wherein.

DETAILED DESCRIPTION OF THE PREFERRED EMBODIMENT

Figure 1:
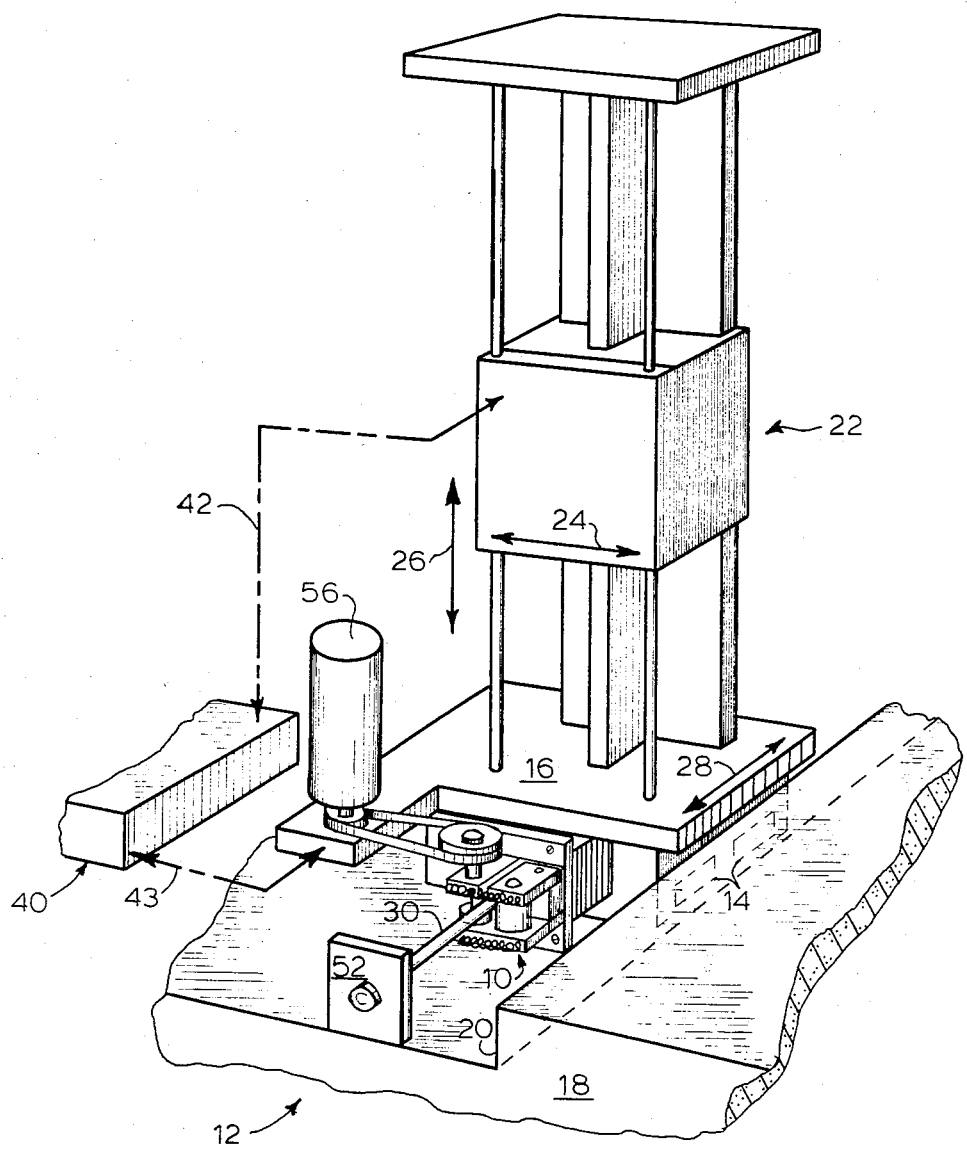
FIG. 1 is a fragmentary perspective and partly schematic view of a drive system constructed in accordance with the present invention and incorporated within a precision machine of the kind employing air bearings.
Figure 2:
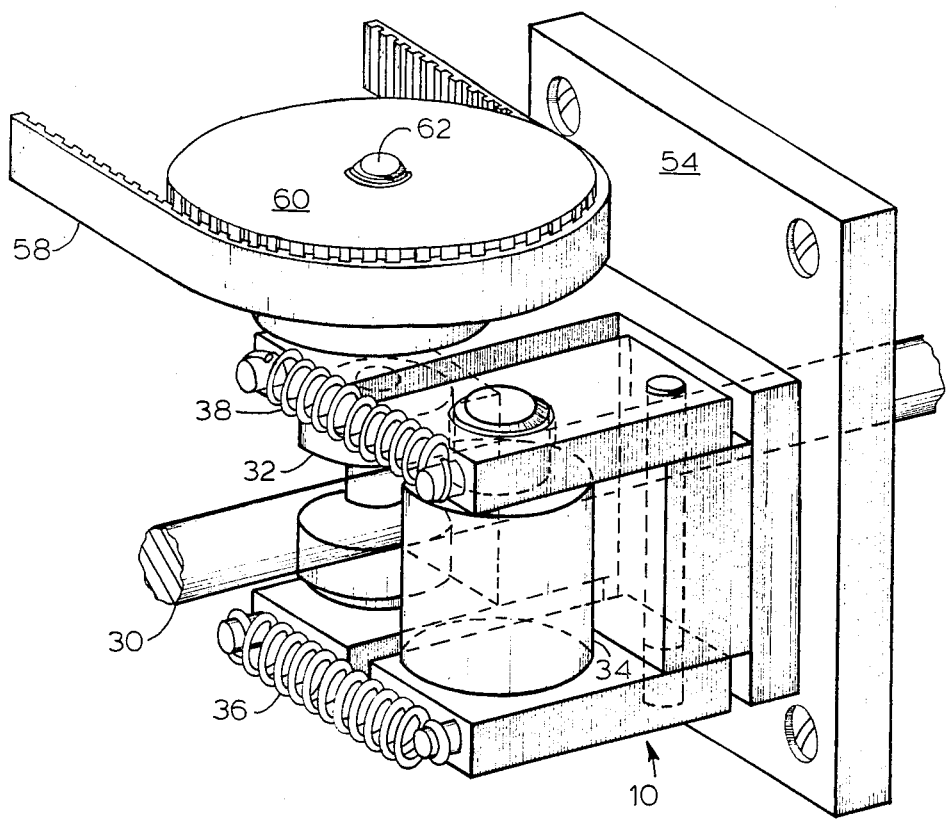
FIG. 2 is an enlarged fragmentary perspective of a portion of the drive system of FIG. 1.
Figure 3:
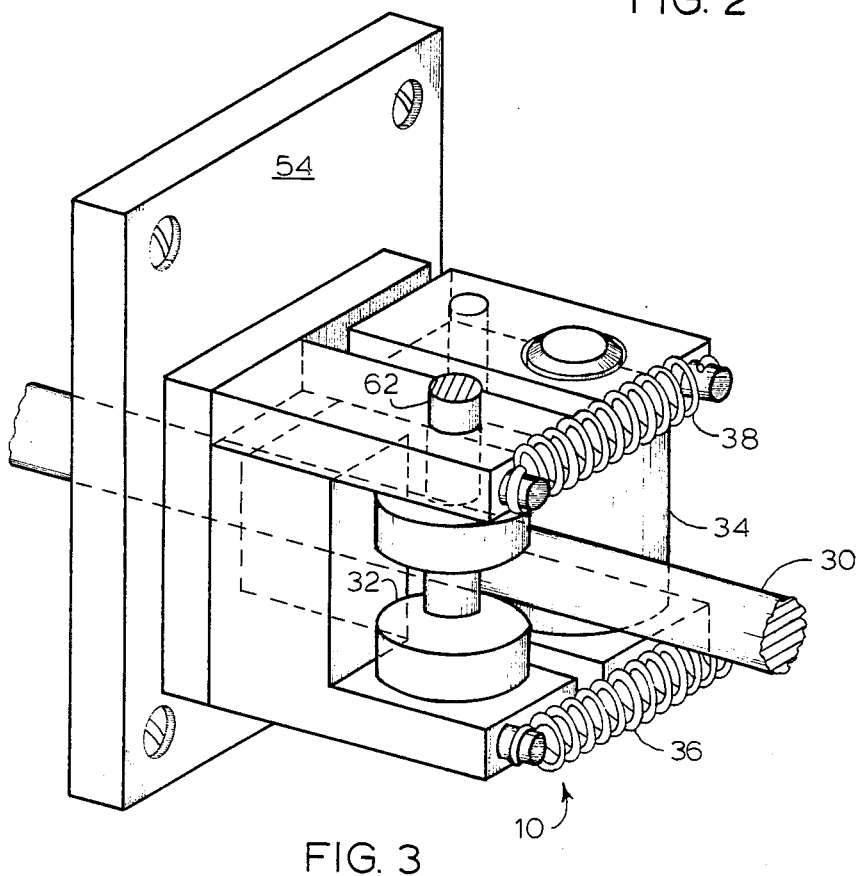
FIG. 3 is a view similar to FIG. 2 but showing another side of the drive system.

In general, the present invention relates to an improved drive system 10 for use in precision machines 12 incorporating air bearings 14. Air bearings 14 provide a virtually friction-free guide of a movable part 16 relative another part 18, which usually is a stationary slab of granite provided with an extremely accurately defined primary sidewall 20. Representative air bearings are disclosed in U.S. Patent Nos. 3,578,827 and 4,378,134, the disclosures of which are incorporated herein by reference. It is to be understood that in the illustration of FIG. 1, air bearings 14 are shown only with respect to the primary sidewall 20. A similar set of air bearings, not shown, also are provided on the other side of the movable part 16 to serve as virtually friction-free guides for a secondary sidewall, not shown, formed in the slab of granite 18 parallel to the primary sidewall 20.

The horizontally movable part 16 carries on it an appropriate superstructure 22 whose design depends on whether the illustrated precision machine 12 is a precision cutting and forming tool, a positioning and coordinate measuring machine, or a surface analysis system. In either event, the superstructure 22 further is designed for movements in two additional directions indicated by arrows 24 and 26, with each of the directions of travel being perpendicular to one another. As a consequence, the precision machine 12 is designed to operate within the rectangular cartesian coordinate system as well understood by those skilled in the art. It also is to be understood that the illustrated drive system 10, designed to move the part 16 in the direction of arrow 28, also is preferably incorporated within the drives, not shown, to move the superstructure 22 in the directions of the arrows 24 and 26. Since these additional drives are identical with the drive system 10, there is no need either to illustrate them or separately to describe them.

The drive system 10 of the invention essentially comprises a drive bar 30 stationarily mounted in the axis of motion of the precision machine 12, as indicated by the arrow 28, a rotary wedge member 32 mounted to the movable part 16 of the machine 12 and designed for drivingly engaging the drive bar 30 on one side thereof, a preloader member 34 rotatably mounted for operatively engaging the drive bar 30 on the other side, and a pair of springs 36 and 38 urging the preloader member 34 to urge the wedge member 32 into frictional driving engagement with the stationary drive bar 30. The drive system 10 is coupled to a positioning servo system 40 via schematically illustrated precision electrical couplings 42. It is this positioning servo system 40 which provides a constant and instantaneous readout of the position and control of the speed of the drive system 10 in its travel along the axial length of the stationary drive bar 30.

Figure 7:
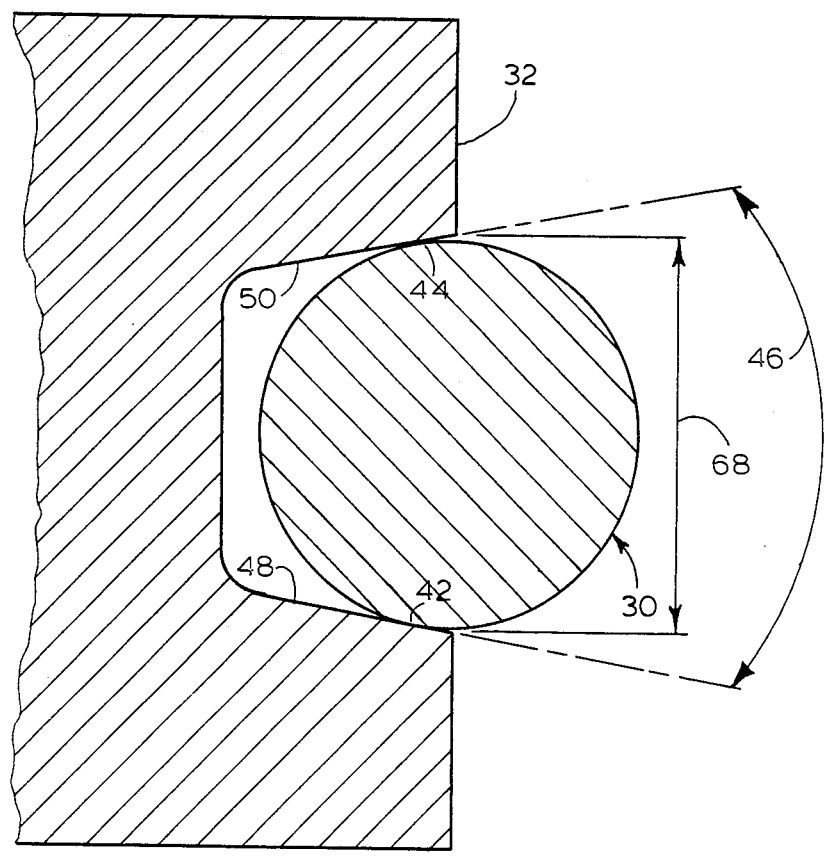
FIG. 7 is an enlarged fragmentary sectional view of the operative parts of FIG. 6.

The drive system 10 of the invention basically operates on the principle of the rotary wedge member 32 frictionally engaging the stationary drive bar 30 on two points 42 and 44 tangential to the drive bar 30, note FIG. 7. In order to achieve the required high level of friction at the contact points 42 and 44 of the drive bar 30 with the wedge member 32, a wedge angle 46 of about 15° to about 30° need be employed, with an angle 46 of about 20° being preferred. As a consequence of this wedge angle 46 obtaining between drive surfaces 48 and 50 of the wedge member 32, a relationship of very high friction along the axis of the drive bar 30 has been achieved, combined nevertheless with a low preload force at the preloader 34. This advantageous combination of low preloader force and very high driving friction prevailing at the points of contact 42 and 44 between the drive bar 30 and the rotary wedge member 32 results in a drive system 10 which is characterized by zero backlash, a drive system 10 which introduces no vibrations or noise into the precision machine 12 incorporating it and, a drive system 10 which requires no lubrication at its operative surfaces, i.e., at the contact points 42 and 44. Thus, the drive system 10 of the invention is indeed "quiet," and as such, well suited to being utilized in air bearing machines, exhibiting little or no internal damping and being very sensitive to vibrations at certain frequencies. As known, extraneous vibrations and noise, in turn, adversely affect the performance of such precision machines 12. The resultant drive system 10 also is characterized by being small and compact, particularly when compared to current drive systems. This compactness and smallness are achieved by the above-described wedge action of the wedge member 32 on the drive bar 30.

The advantageous combination of low preload force and very high driving friction prevailing at the contact points 42 and 44 is not derived solely from the construction of the drive system 10, to be described in detail hereinbelow, nor from the wedge angle 46 alone but also is influenced by the materials from which the drive bar 30 and the wedge member 32 are respectively formed. The group of materials suitable for the bar 30 at the wedge member 32 is characterized by possessing at least about 65 Rockwell hardness. Such materials possessing at least about 65 Rockwell hardness include: ceramic, carbide, ferrotic carbide, carbide coated steel, ceramic coated steel, and cobalt base tool steel. The preloader member 34, a cylindrical member with a smooth surface, on the other hand, preferably is formed from an elastic or plastic material, such as nylon.

As may be observed in FIG. 1, the drive system 10 of the invention is incorporated into one or more of the axes of motion of the precision machine 12, with those axes of motion being respectively indicated by the arrows 24, 26 and 28. It will be appreciated that the drive bar 30 of the drive system 10 is stationarily mounted in the axis of motion of the arrow 28 by a pair of mounting members 52, only the front one of which is illustrated. The drive system's 10 wedge member 32 and preloader member 34 are secured, via a suitable mounting plate 54, to the movable part 16 of the precision machine 12. A motor 56, which preferably is a D.C. servo motor, is connected via a drive belt 58 to a drive wheel 60. The drive wheel 60 in turn is mounted to a shaft 62 of the wedge member 32. The preloader member 34, formed as a smooth cylinder, is preferably pivotally mounted within a pair of members 64 and 66. Members 64 and 66 are pivotable about an axis 63 as indicated by arrow 65. As a consequence of such pivotal mounting, the preloader member 34 is intended to preload the drive bar 30 against the rotatable wedge 32 under the action of the springs 36 and 38. This serves to assure that the rotatable wedge member 32, specifically its driving surfaces 48 and 50, formed with the wedge angle 46, securely grip the stationary drive bar 30 at the two contact points 42 and 44. A frictional force of about 75 pounds to about 150 pounds is effected by a preload force of about 15 pounds to about 30 pounds and the rotation of the wedge member 32 at these contact points 42 and 44. As a consequence, the movable part 16 and the thereon mounted superstructure 22 are displaced along the axial length of the drive bar 30 by axial forces generated at the driving surfaces and without introducing vibrations or noise therein. There is also no need ever to introduce any lubricant either onto the drive surfaces 48 and 50 of the rotary wedge member 32 or along the surface of the stationary drive bar 30 or even at the contact points 42 and 44 between the bar 30 and the drive surfaces 48 and 50.

The above enumerated materials for both the bar 30 and the wedge member 32, i.e., those possessing at least about 65 Rockwell hardness, also are characterized by having low ductility. Consequently, despite many repeated traverses of the rotating wedge member 32 along the axial length of the drive bar 30, there is no build up of materials at the contact points 42 and 44. Rather, due to the low ductility of these materials, any loose particles at the contact points 42 and 44 simply spall off instead of accumulating there.

Figure 4:
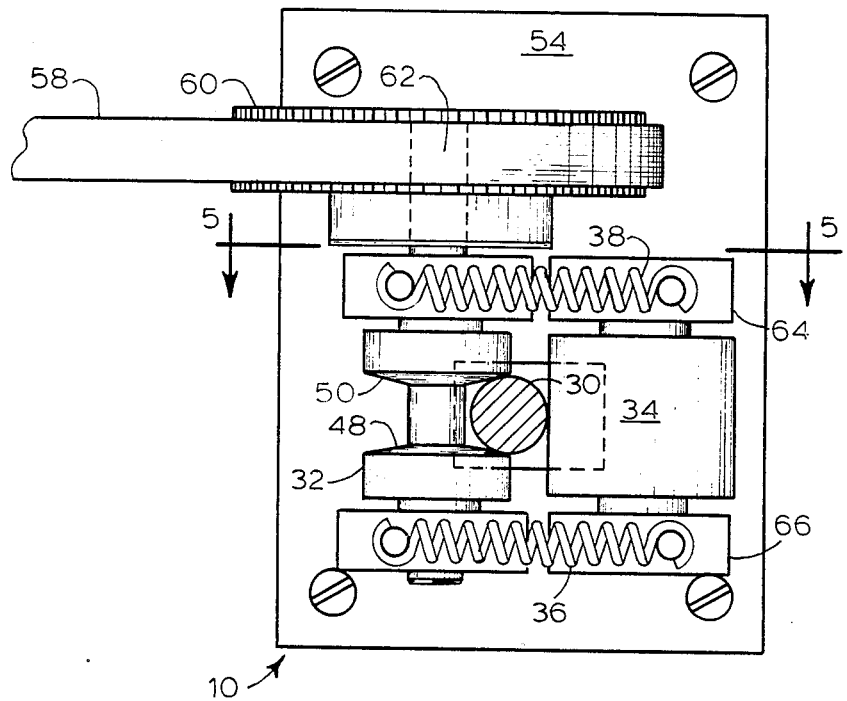
FIG. 4 is a front elevation, partly in section, and on an enlarged scale of the drive system of FIG. 1.
Figure 5:
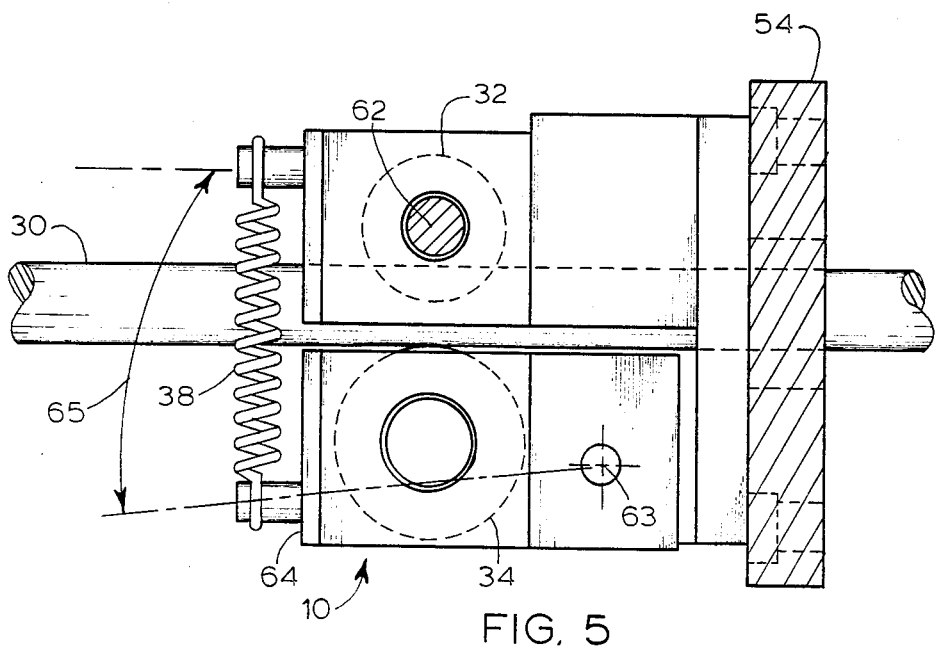
FIG. 5 is a plan view, partly in section, along the lines 5—5 of FIG. 4.
Figure 6:
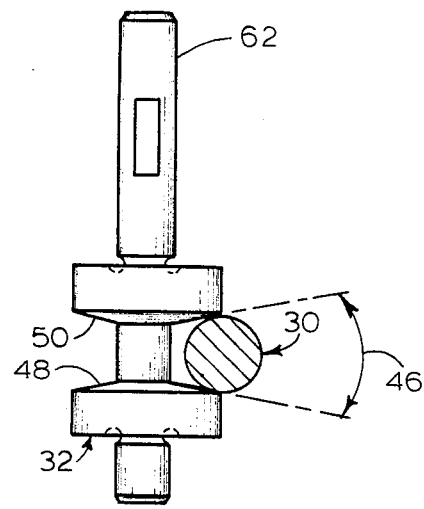
FIG. 6 is an elevation, partly in section, of two operative parts of the drive system of FIG. 1.

The relative sizes of the diameter of the drive bar 30 and of the wedge angle 46 and the throat opening 68 of the wedge member 32 are chosen so that preferably one half of the diameter of the drive bar 30 extends into the wedge member 32, more specifically into the drive surfaces 48 and 50 thereof, note FIGS. 4 and 7.

Thus it has been shown and described an improved drive system 10 for use in precision air bearing machines 12, which drive system 10 satisfies the objects and advantages set forth above.

Since certain changes may be made in the present disclosure without departing from the scope of the present invention, it is intended that all matter described in the foregoing specification or shown in the accompanying drawings, be interpreted in an illustrative and not in a limiting sense.

What is claimed is:

1. A drive system comprising:
   (a) a bar;
   (b) a wedge member drivingly engaging said bar on one side thereof, and having a wedge angle from about 15° to about 30°;
   (c) said bar and said wedge member being formed from one of the following group of materials: ceramic, carbide, ferrotic carbide, carbide coated steel, ceramic coated steel, and cobalt based steel; said group of materials possessing at least about 65 Rockwell hardness;
   (d) a barrel member operatively engaging said bar on the opposite side thereof and being formed of nylon;
   (e) spring means urging said barrel member to urge said wedge member into driving engagement with said bar; and
   (f) said bar being stationary and said wedge member rotatably engaging said bar along the axial length thereof.

2. The drive system of claim 1 for use in an air bearing machine and further including a positioning servo system operatively coupled to said driven system.

3. The drive system of claim 2 wherein said air bearing machine is one of the group comprising: precision cutting and forming tools, positioning and coordinate measuring systems, and surface analysis systems.

4. A drive system and an air bearing machine comprising, in combination:
   (a) a ststionary bar member;
   (b) a rotary wedge member operatively engaging said bar member on the opposite side thereof;
   (c) a preloader operatively engaging said bar member on the opposite side thereof;
   (d) spring means urging said preloader toward said wedge member;
   (e) a positioning servo system operatively coupled to said drive system;
   (f) said stationary bar member and said rotary wedge member being formed of a material possessing at least about 65 Rockwell hardness;
   (g) said air bearing machine being a coordinate measuring machine and said rotary wedge member being formed with a wedge of about 15° to about 30° to engage frictionally said bar member on two points tangential to said bar member.

5. A drive system and an air bearing machine comprising, in combination;
   (a) a stationary bar member;
   (b) a rotary wedge member operatively engaging said bar member on the opposite side thereof;
   (c) a preloader operatively engaging said bar member on the opposite side thereof;
   (d) spring means urging said preloader toward said wedge member;
   (e) a positioning servo system operatively coupled to said drive system;
   (f) said stationary bar member and said rotary wedge member being formed of a material possessing at least about 65 Rockwell hardness;
   (g) said air bearing machine being a precision cutting tool and said bar member and said wedge member being formed from one of the following group of materials: ceramic, carbide, ferrotic carbide, carbide coated steel, ceramic coated steel, and cobalt base tool steel; said group of materials possessing at least about 65 Rockwell hardness; said wedge member being formed with a wedge of about 15° to about 30° to engage frictionally said bar member on two points tangential to said bar member.

6. A drive system and an air bearing machine comprising, in combination:
   (a) a stationary bar member;
   (b) a rotary wedge member operatively engaging said bar member on the opposite side thereof;
   (c) a preloader operatively engaging said bar member on the opposite side thereof;
   (d) spring means urging said preloader toward said wedge member;
   (e) a positioning servo system operatively coupled to said drive system;
   (f) said stationary bar member and said rotary wedge member being formed of a material possessing at least about 65 Rockwell hardness;
   (g) said air bearing machine being a surface analysis system and said preloader being a cylinder mounted for rotational displacement about an axis normal to the axis of said bar member, said cylinder having a smooth surface formed of nylon; said rotary wedge member being formed with a wedge of about 15° to about 30° to engage frictionally said bar member on two points tangential to said bar member.

7. In a first coordinate measuring system, a drive for driving said coordinate measuring system with the aid of a positioning servo system, said drive comprising:
   (a) a bar mounted in one of the axes of motion of said first coordinate measuring system;
   (b) a wedge member mounted for drivingly engaging said bar on one side thereof;
   (c) a barrel member mounted for operatively engaging said bar on the other side thereof; and
   (d) spring means urging said barrel member to urge said wedge member into driving engagement with said bar;
   (e) said drive being operatively coupled to said positioning servo system;
   (f) the wedge of said wedge member being from about 15° to about 30° and said coordinate system employing air bearings;
   (g) said bar and said wedge member being formed from a material possessing at least about 65 Rockwell hardness.

8. In said first coordinate measuring system of claim 7 wherein said bar is stationary and said wedge member engages said bar tangentially at two points and with a high frictional force along the axial length of said bar at said two points between said bar and said wedge member while exhibiting low preloader force between said bar and said wedge member.

9. In said first coordinate measuring system of claim 7 further including means for rotatably driving said wedge member about an axis normal to the longitudinal axis of said bar, and wherein said bar and said wedge member are formed from one of the following group of materials: ceramic, carbide, ferrotic carbide, carbide coated steel, ceramic coated steel, and cobalt base tool steel; said group of materials possessing at least about 65 Rockwell hardness.

10. In said first coordinate measuring system of claim 7 wherein said barrel member is formed of nylon, and wherein one half of the diameter of said bar extends into said wedge member.

11. In said first coordinate measuring system of claim 7 wherein said drive requires no lubrication and is characterized by zero backlash.

* * * * *